United States Patent [19]
Blouch

[11] 3,840,811
[45] Oct. 8, 1974

[54] DUPLEXER TYPE RADIO-TELEPHONE DATA RECEIVER AND TRANSMISSION SYSTEM

[75] Inventor: Roger D. Blouch, Willow Grove, Pa.

[73] Assignee: International Mobile Machines Corporation, Philadelphia, Pa.

[22] Filed: Jan. 8, 1973

[21] Appl. No.: 322,121

[52] U.S. Cl. .................. 325/55, 179/41 A, 325/470, 343/177

[51] Int. Cl. ............................................ H04b 1/54

[58] Field of Search ......... 325/55, 57, 64, 369, 469, 325/470, 15, 18, 21; 343/176, 177, 179, 41 A

[56] References Cited

UNITED STATES PATENTS

| | | | |
|---|---|---|---|
| 3,458,664 | 7/1969 | Adlhoch et al. | 325/55 X |
| 3,496,467 | 2/1970 | Lundgren | 325/55 X |
| 3,535,636 | 10/1970 | Muilwijk | 325/57 X |
| 3,571,519 | 3/1971 | Tsimbidis | 179/41 A |
| 3,651,407 | 3/1972 | Sarallo et al. | 325/18 |

*Primary Examiner*—Benedict V. Safourek
*Attorney, Agent, or Firm*—Arthur A. Jacobs

[57] ABSTRACT

A radio-telephone system embodying a duplexer network whereby a request for computerized data may be transmitted to a base station and the data received from the base station through a single antenna. The system includes a scanner to scan incoming signals in conjunction with a decoder. The decoder receives the signals and when they are incorrect, causes the scanner to continue scanning, while, when they are correct, it causes activation of the system to permit it to transmit a request for data and receive the data in return.

6 Claims, 2 Drawing Figures

DUPLEXER TYPE RADIO-TELEPHONE DATA RECEIVER AND TRANSMISSION SYSTEM

This invention relates to a communication system for receiving computerized data or the like, and it particularly relates to radio-telephone type system embodying a duplexer arrangement.

The system of the present invention is adapted to be used in a compact, portable unit having an ordinary telephone handset with either a dial or push-button pad. Although other radio-telephone type systems for this purpose have heretofore been proposed, they were generally of the simplex type which required too much bulk to be readily portable or were overly complex and commercially uneconomical.

It is one object of the present invention to provide a radio-telephone type system for the transmission of computerized data and the like which is readily adapted for embodiment in a compact, highly portable unit.

Another object of the present invention is to provide a system of the aforesaid type which, although simple and compact, is adapted to effect all necessary functions of a commercial system, including requesting and receiving required data as well as billing for the information.

Other objects and many of the attendant advantages of this invention will be readily appreciated as the same becomes better understood by reference to the following description when read in conjunction with the accompanying drawings wherein.

Figures 1, 2:
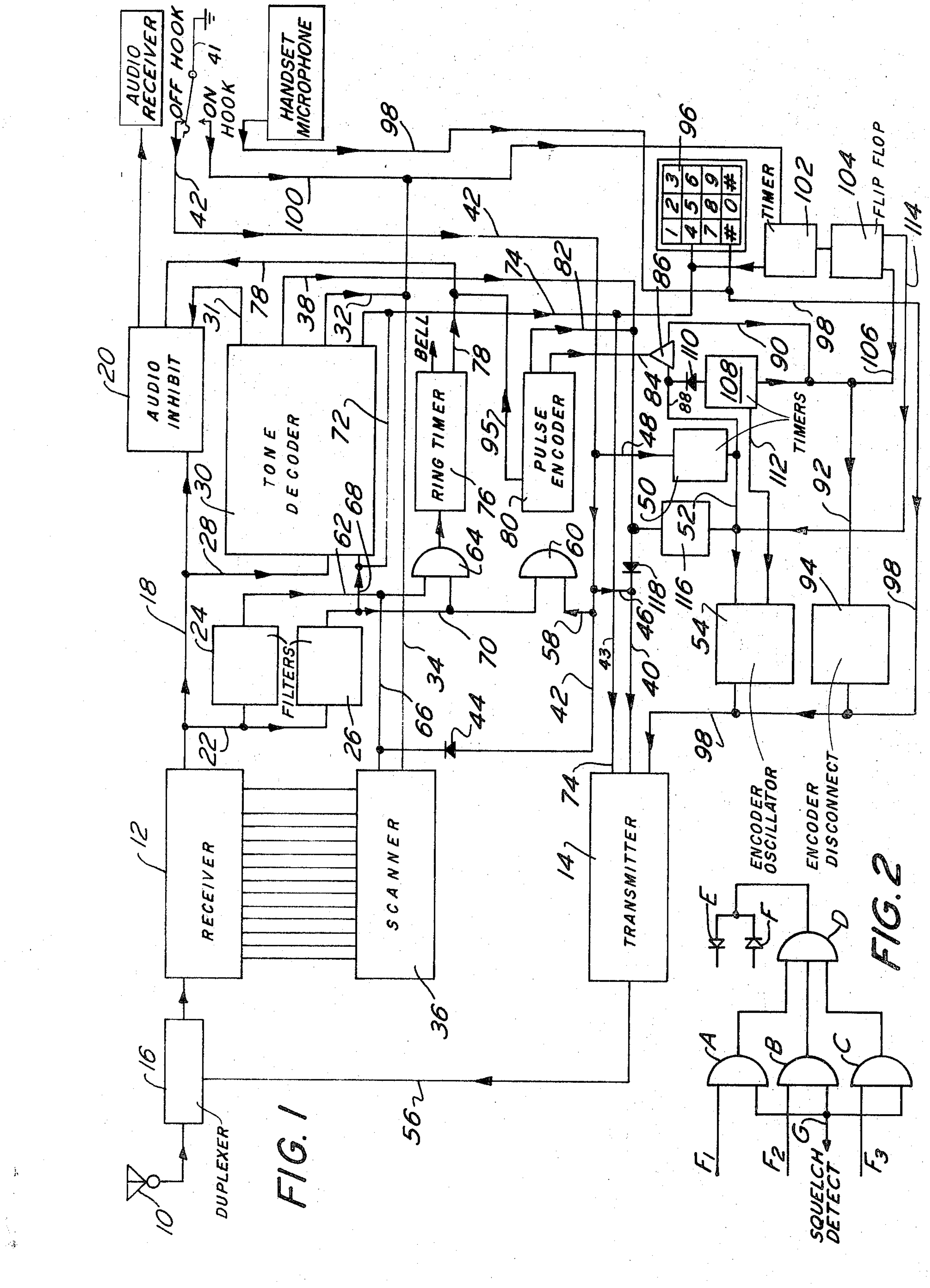
FIG. 1 is a schematic representation of a system embodying the present invention.
FIG. 2 is a simplified schematic view of the scanner.

Referring in greater detail to the drawing, there is shown an antenna 10 for transmitting and receiving data to and from a base station, not shown, where certain required computerized data is available. The antenna 10 is in circuit with a standard FM radio receiver 12 and a standard FM transmitter 14 through a duplexer unit 16. The duplexer 16 comprises a set of tuned cavities that will pass the receiver frequency through the duplexer and, at the same time, allow the transmitter frequency to pass to the antenna 10. It is of the type available commercially as Model DB-4087 sold by Decibel Products, Inc., Dallas, Texas.

Tone signals received by the receiver 12 are passed through line 18 to the audio receiver portion of a telephone-type handset (not shown), an audio inhibit 20 being interposed in the line 18 to prevent all but the proper signals passing to the handset. The signals are also passed through a line 22 to two filters, designated respectively 24 and 26, and through line 28 to the input of a tone decoder 30 which comprises phase-locked loops that reject all but the frequency that they are tuned to.

The tone decoder 30 maintains the audio inhibit in its inhibiting condition through line 31 and is provided with a comparison circuit which is adapted to separate correct digits (that is, tones and digits corresponding with the particular user of the apparatus) from incorrect tones and digits. Incorrect tones are passed through line 32 and line 34 to a scanner 36. The receiver 12 has 12 frequencies or channels plus a "ground".

The scanner 36 is adapted to sample each frequency in turn. When an incorrect series of digits is transmitted from the decoder 30 to the scanner 36, the scanner 36 resumes scanning of the incoming signals received by the receiver 12.

The scanner 36, as shown in FIG. 2, comprises three AND gates, respectively designated A, B and C, in electrical circuit with an inverted OR gate D. The OR gate D is in circuit with a pair of back-to-back isolation diodes E and F. When a radio signal is received, it passes to a squelch detector. The squelch detector passes a logic level signal through line G to all three AND gates, A, B and C. These AND gates conduct to send a signal to the OR gate D. The OR gate D then sends a signal to the diodes E and F. One of the diodes is positive and one is negative. When there is no appropriate radio signal, the squelch detector does not conduct and this causes the OR gate to go positive. The positive signal passes to the positive diode causing it to send a signal to a corresponding oscillator to cause it to continue scanning. When an appropriate radio signal is received, the AND gates cause the OR gates to go negative and the negative signal is passed to the negative diode which locks on the signal.

A correct series of digits will pass from the decoder 30 through line 38 and line 40 to turn the transmitter 14 on.

To initiate a call to the computer at the base station, the handset is removed from its hook. This closes a switch 41 which opens a circuit through line 42, in which is optionally interposed a rectifier 44, to the scanner 36. The signal through this circuit locks onto a particular channel or frequency in the scanner to hold that channel available. At the same time, the pulse passes through line 46 to line 40 to turn on the transmitter 14, and through line 48 to a timer 50. The timer 50 acts through line 52 to activate a 2,150 cps. encoder 54, which is an oscillator that oscillates at that frequency, for 250 milliseconds. Simultaneously, the signal passing through line 42 acts through line 58 to set an AND gate 60. The encoder 54 passes the coded signal to the transmitter 14 which sends it through line 56 to the duplexer 16 from where it is transmitted by antenna 10 to the base station.

The base station transmits various signals to the various stations or users requesting specific data. Among these signals are those for the user of the apparatus shown here. These signals include a 2,000 cps. idle tone and an 1,800 cps. data tone. When the signals are received by the receiver 12, they not only pass through line 18 to the audio inhibit 20 and through line 28 to the input of the decoder 30, but also pass through line 22 to the filters 24 and 26.

The filter 24 passes the 2,000 cps. tone through line 62 to set an AND gate 64 and also locks on the idle channel in the scanner 36 through line 66. The 1,800 cps. tone is passed by filter 26 through line 68 into the decoder 30 to enable the decoder to decode the incoming signals. The tone is also passed through line 70 to cause the AND gates 60 and 64 to conduct, and is passed through line 72 and line 74 into the transmitter 14 to inhibit the transmitter from sending any other signal.

The AND gate 64 activates an alarm means, here indicated as a ring timer 76 and also acts through line 78 to enable the audio inhibit 20. The ring timer operates by taking the output of the AND gate and cycles an SS switch on and off at a predetermined rate to simulate the ringing of a telephone.

The AND gate 60 conducts to send a signal through a 7-digit pulse encoder 80 which sends a signal through line 82 and line 40 to turn on the transmitter 14, and also sends a pulse through line 84 to an inverter 86 which sequentially switches through line 88 to the encoder 54 and through lines 90 and 92 to the encoder disconnect 94. This sends a signal through the transmitter 14 to the base station for billing purposes. At the same time, it sets up the audio inhibit enabling circuit through line 95. The 7-digit pulse encoder takes a stored 7 digit number and changes it into pulses comprising an identification signal so the base station knows who is initiating a call and can bill accordingly. It contains a memory, pulse circuits and interface circuits to drive the transmitter with pulsed tones. In the above manner, when the handset is removed from the hook, this automatically (a) keeps the scanner locked on a particular channel, (b) sends the user's number to the base station for billing, (c) informs the base station that a particular channel will be used, and (d) sets up a dial tone. The touch-tone pad 96 is then operated to dial the required number, this signal passing through line 43 to the transmitter.

When the number has been dialed and communication established, audio signals are transmitted from the microphone portion of the handset through line 98 to the audio input of the transmitter while audio signals are received through line 18 and through the now enabled audio inhibit 20.

When the transmission is to be ended and the network disconnected, the handset is placed on the hook. This sends a pulse through line 100 and line 34 to the scanner 36 which thereupon resumes scanning incoming signals. Simultaneously, a pulse is sent through line 100 to a timer 102 which actuates a flip-flop 104 at a 25 millisecond rate. The flip-flop 104 sends a pulse through line 106, timer 108, which is tied into line 88 through an optional rectifier 110, and line 112 to deactivate the encoder 54. It also sends a pulse through lines 106 and 92 to deactivate the encoder disconnect 94. In addition, it sends a pulse through line 114, timer 116, optional rectifier 118 and line 40 to turn off the transmitter 14. The rectifiers 110 and 118, as well as the previously mentioned rectifier 44, are not necessary for the operation of the device but are provided to isolate the logic levels.

The invention claimed is:

1. A radio-telephone system including, in combination, a radio receiver adapted to receive tone and audio signals, a transmitter adapted to transmit tone and audio signals, and a duplexer coupled to both said radio receiver and said transmitter to provide simultaneous passage therethrough of the signals passing to said radio receiver and the signals passing from said transmitter, an audio receiver coupled to said radio receiver through an audio inhibit means, a tone decoder coupled both to said radio receiver and to said audio inhibit means, said tone decoder being adapted to receive tone signals transmitted from a base station through said radio receiver and to separate a correct tone signal of predetermined frequency from incorrect tone signals of different frequencies, said tone decoder acting to maintain the audio inhibition of said audio inhibit means to prevent passage of audio signals from the radio receiver to the audio receiver when said tone decoder detects incorrect tone signals and acting to deactivate said audio inhibit means to permit passage of said audio signals from said radio receiver to said audio receiver when said tone decoder detects the correct tone signal, said tone decoder also being coupled to said transmitter and to a radio signal scanner coupled to said radio receiver, said tone decoder being adapted to apply said correct tone signal to said transmitter to actuate said transmitter and to apply both the correct and incorrect tone signals to the scanner, said scanner being adapted to maintain scanning of the incoming signals when said scanner is receiving incorrect tone signals from said tone decoder and to lock the radio receiver to a particular channel when said scanner receives the correct tone signal from said tone decoder, said radio receiver being coupled to a first and second gated control means, the first gated control means being coupled both to an alarm means and to said audio inhibit means to actuate said alarm means and to enable said audio inhibit means upon receipt of a signal of predetermined frequency from said base station through said radio receiver, and said second gated control means being coupled to means for sending an identification signal through said transmitter to said base station.

2. The system of claim 1 wherein a first frequency signal filter is coupled between said radio receiver and said first gated control means, and a second frequency signal filter is coupled between said radio receiver and both said first and second gated control means.

3. The system of claim 1 wherein said audio receiver and microphone are connected to each other in a single handset unit, said unit being removably positioned on a hook, said hook being connected to a normally closed switch, said hook being constructed to open said switch when said unit is positioned on said hook.

4. The system of claim 3 wherein said switch is coupled to said scanner, said scanner being locked on a particular channel when said switch is closed and being released for scanning when said switch is open.

5. The system of claim 1 wherein said means for sending said identification signal through said transmitter to said base station comprises a pulsed tone encoder coupled to an inverter means which is coupled to an encoder means and an encoder disconnect means which are, in turn, coupled to said transmitter, said inverter means being adapted to sequentially activate and deactivate said encoder means and encoder disconnect means.

6. The system of claim 5 wherein said switch is coupled to a deactivating means to deactivate said encoder means and said encoder disconnect means when said switch is open.

* * * * *